United States Patent
Fukuman et al.

(10) Patent No.: US 10,451,734 B2
(45) Date of Patent: Oct. 22, 2019

(54) OBJECT DETECTING APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 145 days.

(21) Appl. No.: 14/918,330

(22) Filed: Oct. 20, 2015

(65) Prior Publication Data
US 2016/0116591 A1   Apr. 28, 2016

(30) Foreign Application Priority Data
Oct. 22, 2014   (JP) .................. 2014-215099

(51) Int. Cl.
*G01S 15/00* (2006.01)
*G01S 15/93* (2006.01)
(Continued)

(52) U.S. Cl.
CPC ............ *G01S 15/931* (2013.01); *G01S 7/527* (2013.01); *G01S 15/46* (2013.01); *G01S 15/878* (2013.01);
(Continued)

(58) Field of Classification Search
CPC ............ G01S 14/96; G01S 14/46; G01S 14/93
See application file for complete search history.

(56) References Cited

U.S. PATENT DOCUMENTS 3,418,625 A * 12/1968 Anstey .................. G01N 29/40
367/40
5,122,990 A *  6/1992 Deines .................... G01S 7/539
367/100
(Continued)

FOREIGN PATENT DOCUMENTS

CN       103605125       2/2014
JP       S63127179       5/1988
(Continued)

OTHER PUBLICATIONS

U.S. Appl. No. 14/880,526 and its entire file history, Oct. 12, 2015, Fukuman, et al.
(Continued)

*Primary Examiner* — Hovhannes Baghdsaryan
(74) *Attorney, Agent, or Firm* — Knobbe, Martens, Olson & Bear, LLP

(57) ABSTRACT

An object detecting apparatus includes a distance calculator that calculates a distance to the object, a wave height acquirer that acquires a respective peak value of the plurality of reflected waves, and multiple reflection determiner. When a reflected wave for which a first distance to the object is calculated to be the smallest in the reflected waves is defined as a first wave, and another reflected wave to which a second distance is calculated as twice or more integer times the first distance calculated for the first wave and a difference of the peak value relative to the first wave which is larger than a predetermined value is present in the reflected waves, the multiple reflection determiner determines that multiple reflection is occurring in a second wave or thereafter.

5 Claims, 3 Drawing Sheets

(51) Int. Cl.
   *G01S 7/527* (2006.01)
   *G01S 15/46* (2006.01)
   *G01S 15/87* (2006.01)

(52) U.S. Cl.
   CPC ... *G01S 2015/465* (2013.01); *G01S 2015/938* (2013.01)

(56) References Cited

U.S. PATENT DOCUMENTS

| | | | |
|---|---|---|---|
| 5,315,562 A * | 5/1994 | Bradley | G01S 15/104 367/89 |
| 5,689,250 A | 11/1997 | Kremser | |
| 5,761,155 A | 6/1998 | Eccardt et al. | |
| 5,923,282 A | 7/1999 | Honma et al. | |
| 5,940,011 A | 8/1999 | Agravante et al. | |
| 6,289,282 B1 * | 9/2001 | Hassler | B60Q 9/006 342/455 |
| 6,434,486 B1 * | 8/2002 | Studt | G01S 7/4004 180/169 |
| 6,898,528 B2 | 5/2005 | Zorka | |
| 7,068,155 B2 | 6/2006 | Kade | |
| 7,202,776 B2 | 4/2007 | Breed | |
| 7,873,181 B1 | 1/2011 | Maluf | |
| 8,108,147 B1 | 1/2012 | Blackburn | |
| 8,452,506 B2 * | 5/2013 | Groult | G01S 15/931 303/193 |
| 8,605,947 B2 | 10/2013 | Zhang et al. | |
| 8,989,944 B1 | 3/2015 | Agarwal et al. | |
| 9,221,396 B1 | 12/2015 | Zhu et al. | |
| 9,507,023 B2 | 11/2016 | Nakano | |
| 9,541,644 B2 | 1/2017 | Hoenes et al. | |
| 2002/0047780 A1 | 4/2002 | Nishimoto | |
| 2003/0195704 A1 | 10/2003 | Sekiguchi | |
| 2004/0238249 A1 | 12/2004 | Kim | |
| 2005/0046606 A1 | 3/2005 | Yoneda | |
| 2005/0195071 A1 | 9/2005 | Ewerhart et al. | |
| 2006/0013069 A1 * | 1/2006 | Wilson | G01S 7/53 367/111 |
| 2006/0031015 A1 | 2/2006 | Paradie | |
| 2006/0085177 A1 | 4/2006 | Toyama et al. | |
| 2006/0119473 A1 | 6/2006 | Gunderson et al. | |
| 2007/0176822 A1 | 8/2007 | Shirakawa | |
| 2008/0068146 A1 | 3/2008 | Cauldwell | |
| 2008/0204208 A1 | 8/2008 | Kawamata et al. | |
| 2009/0299662 A1 * | 12/2009 | Fehrenbach | G01F 23/28 702/55 |
| 2010/0214872 A1 | 8/2010 | Schmid et al. | |
| 2011/0044507 A1 | 2/2011 | Strauss et al. | |
| 2011/0133917 A1 | 6/2011 | Zeng | |
| 2011/0241857 A1 | 10/2011 | Brandenburger et al. | |
| 2012/0283895 A1 | 11/2012 | Noda | |
| 2012/0307594 A1 | 12/2012 | Enoue et al. | |
| 2014/0340993 A1 | 11/2014 | Honda | |
| 2015/0097704 A1 | 4/2015 | Kwon | |
| 2015/0310281 A1 | 10/2015 | Zhu et al. | |
| 2016/0253575 A1 | 9/2016 | Kakegawa et al. | |
| 2017/0261602 A1 | 9/2017 | Olshansky et al. | |

FOREIGN PATENT DOCUMENTS

| | | |
|---|---|---|
| JP | H06-138225 | 5/1994 |
| JP | H06-150195 | 5/1994 |
| JP | 2005-070943 | 3/2005 |
| JP | 2008-039497 | 2/2008 |
| JP | 2008-122137 | 5/2008 |
| JP | 2013-124982 | 6/2013 |
| JP | 2014-089077 | 5/2014 |
| JP | 2014-089077 A | 5/2014 |
| JP | 2014-093039 | 5/2014 |
| JP | 2015-004562 | 1/2015 |
| KR | 2013-0119674 | 11/2013 |
| WO | WO 2005/091015 | 9/2005 |

OTHER PUBLICATIONS

U.S. Appl. No. 14/887,623 and its entire file history, Oct. 20, 2015, Fukuman, et al.
U.S. Appl. No. 14/887,625 and its entire file history, Oct. 20, 2015, Fukuman, et al.
U.S. Appl. No. 14/918,319 and its entire file history, Oct. 20, 2015, Fukuman, et al.
U.S. Appl. No. 14/918,373 and its entire file history, Oct. 20, 2015, Fukuman, et al.
U.S. Appl. No. 14/918,920 and its entire file history, Oct. 21, 2015, Fukuman, et al.
U.S. Appl. No. 14/919,498 and its entire file history, Oct. 21, 2015, Fukuman, et al.
U.S. Appl. No. 14/919,562 and its entire file history, Oct. 21, 2015, Fukuman, et al.
Notice of Allowance and Fee(s) Due, U.S. Appl. No. 14/919,562, dated Aug. 1, 2018, in 11 pages.
Notice of Allowance and Fee(s) Due, U.S. Appl. No. 14/918,920, dated Jun. 11, 2018, in 11 pages.
Chinese document, "The Basic Characteristics of a Multiple Echo", in 8 pages.
"Study on Airborne Ultrasonic Position and Velocity Measurement of Multiple Objects Using Chirp Signal", by Sakai Ko, Kurosawa Minoru, Hirata Shinnosuke (Tokyo Institute of Technology), Orino Yuichiro (The University of Shiga Prefecture), Acoustical Society of Japan Spring Meeting, Mar. 2013, p. 1451-1452, in 4 pages.
Installation and Operation of Ship Navigation System, Beijing Institute of Technology Press, dated Aug. 2014 in 8 pages.
United States Patent and Trademark Office, Office Action, U.S. Appl. No. 14/880,526, dated Jul. 6, 2017 in 12 pages.
United States Patent and Trademark Office, Final Office Action, U.S. Appl. No. 14/880,526, dated Feb. 28, 2018 in 11 pages.
United States Patent and Trademark Office, Office Action, U.S. Appl. No. 14/918,373, dated Dec. 19, 2017 in 13 pages.
United States Patent and Trademark Office, Final Office Action, U.S. Appl. No. 14/918,373, dated Apr. 9, 2018 in 9 pages.
United States Patent and Trademark Office, Office Action, U.S. Appl. No. 14/887,623, dated Aug. 30, 2017 in 21 pages.
United States Patent and Trademark Office, Final Office Action, U.S. Appl. No. 14/887,623, dated May 7, 2018 in 38 pages.
United States Patent and Trademark Office, Office Action, U.S. Appl. No. 14/918,319, dated Sep. 5, 2017 in 13 pages.
United States Patent and Trademark Office, Final Office Action, U.S. Appl. No. 14/918,319, dated Feb. 28, 2018 in 12 pages.
United States Patent and Trademark Office, Office Action, U.S. Appl. No. 14/918,920, dated Feb. 23, 2017 in 13 pages.
United States Patent and Trademark Office, Office Action, U.S. Appl. No. 14/918,920, dated Dec. 15, 2017 in 13 pages.
United States Patent and Trademark Office, Office Action, U.S. Appl. No. 14/919,562, dated Sep. 12, 2017 in 14 pages.
United States Patent and Trademark Office, Final Office Action, U.S. Appl. No. 14/919,562, dated Mar. 29, 2018 in 12 pages.
United States Patent and Trademark Office, Office Action, U.S. Appl. No. 14/887,625, dated May 10, 2018 in 26 pages.
United States Patent and Trademark Office, Notice of Allowance, U.S. Appl. No. 14/918,920, dated Apr. 11, 2018 in 7 pages.
Tian Fenxia, "Pipeline Obstacle Detecting and Locating Based on Ultrasonic Waves", Southwest Jiaotong Postraduate Dissertation, Jun. 2013, TP391, p. 30.
United States Patent and Trademark Office, Advisory Action, U.S. Appl. No. 14/880,526, dated May 25, 2018, in 4 pages.
United States Patent and Trademark Office, Final Office Action, U.S. Appl. No. 14/918,319, dated Jul. 19, 2018 in 12 pages.
Office Action of U.S. Appl. No. 14/880,526 dated Oct. 9, 2018.
Notice of Allowance of U.S. Appl. No. 14/918,373 dated Oct. 18, 2018.
Notice of Allowance of U.S. Appl. No. 14/918,920 dated Oct. 18, 2018.
Office Action of U.S. Appl. No. 14/918,319 dated Nov. 26, 2018.
Notice of Allowance and Fee(s) Due, U.S. Appl. No. 14/887,623, dated Sep. 4, 2018, in 28 pages.

(56) References Cited

OTHER PUBLICATIONS

Corrected Notice of Allowance and Fee(s) Due, U.S. Appl. No. 14/887,623, dated Sep. 11, 2018, in 5 pages.
Notice of Allowance and Fee(s) Due, U.S. Appl. No. 14/887,625, dated Sep. 10, 2018, in 14 pages.
Notice of Allowance for U.S. Appl. No. 14/880,526; dated May 22, 2019.
Notice of Allowance and Fee(s) Due, U.S. Appl. No. 14/919,562, dated Dec. 26, 2018, in 9 pages.
Notice of Allowance for U.S. Appl. No. 14/880,526; dated Feb. 13, 2019.
Office Action of U.S. Appl. No. 14/918,319 dated May 28, 2019.
Notice of Allowance for U.S. Appl. No. 14/918,373; dated Jun. 12, 2019.
Notice of Allowance for U.S. Appl. No. 14/919,562; dated Jun. 11, 2019.

* cited by examiner

OBJECT DETECTING APPARATUS

CROSS-REFERENCE TO RELATED APPLICATION

This application is based on and claims the benefit of priority from earlier Japanese Patent Application No. 2014-215099 filed Oct. 22, 2014, the description of which is incorporated herein by reference.

TECHNICAL FIELD

The present disclosure relates to an object detecting apparatus for detecting objects in surroundings.

BACKGROUND

Conventionally, it is proposed to detect an object existing in the surroundings of a vehicle, such as a preceding vehicle, a pedestrian or obstacles by using a distance measuring sensor such as an ultrasonic sensor mounted on the vehicle, and to perform various processes to improve a running safety of the vehicle such as actuating a braking device or notifying a driver based on an object detection result.

In a vehicle width direction, which is a direction perpendicular to a traveling direction of the vehicle, there is a small possibility that the vehicle and the object will come in contact if the object is not present in a range of the vehicle width.

However, when measuring only a distance between the vehicle and the object, the position of the object in the vehicle width direction cannot be detected, and it may be determined that there is a possibility that the vehicle will contact the object even if no object exists in the vehicle width, thus an actuation of the braking device or notification to the driver takes place.

In this respect, as for detecting the position of the object positioned in front of the vehicle in the vehicle width direction, there is an object detecting apparatus disclosed in Japanese Patent Application Laid-Open Publication No. 2014-89077.

In the object detecting apparatus according to the Publication No. 2014-89077, two distance measuring sensors are mounted in the vehicle, and a position of the object in the vehicle width direction is calculated by using the principle of triangulation.

Then, if the position of the object in the vehicle width direction is within the vehicle width, it is determined that there is a risk of the vehicle contacting with the object, and if the position of the object in the vehicle width direction is not within the vehicle width, it is determined that there is no risk of the vehicle contacting with the object.

By executing this process, the object detecting apparatus according to the Publication No. 2014-89077 can suppress the braking device from operating when no object exists within the vehicle width.

In the object detecting apparatus disclosed in the Publication No. 2014-89077, a number of detectable objects in a single object detecting opportunity is limited to one.

If a plurality of objects is present in front of the vehicle, only an object present at a position closest to the vehicle is detected, and another object that is present farther away from the closest object cannot be detected.

At this time, if the object that exists in the nearest position is not present within the vehicle width, and the distant object is present within the range of the vehicle width, there is a risk that the braking device may not be operated.

In this respect, in addition to a reflected wave of the object positioned in the most vicinity of the vehicle, a reflected wave of the other object present in a farther position is received as a second wave, and an object may be detected by using the second wave also.

However, depending on the position of the object and a shape of the object relative to the vehicle, it is believed that a repetition of reflection between the same object, or so-called multiple reflection occurs.

In other words, when detecting an object by using the second wave, the second wave may be reflected several times by a first object.

At this time, when calculating the position of the object by using the second wave, a position of a second object that does not actually exist may be calculated incorrectly, and a braking control, etc. to avoid contacting with an object that does not actually exist may be performed.

The same situation may occur even when a reflected wave of a third wave and after is used in addition to the second wave for detecting the object.

SUMMARY

An embodiment provides an object detecting apparatus that can detect an object appropriately even when multiple reflection occurs.

An object detecting apparatus that detects a position of an object by transmitting probe waves in surroundings and receiving a reflected wave of the probe waves as detected information of the object according to an aspect includes a distance calculator that calculates a distance to the object by using a plurality of reflected waves when the plurality of reflected waves are received for a single transmission time of the probe waves, a wave height acquirer that acquires a respective peak value of the plurality of reflected waves, and multiple reflection determiner.

When a reflected wave for which a first distance to the object is calculated as the smallest among the plurality of reflected waves is defined as a first wave, and another reflected wave to which a second distance is calculated as twice or more integer times the first distance calculated for the first wave and a difference of the peak value relative to the first wave which is larger than a predetermined value is present in the plurality of reflected waves, the multiple reflection determiner determines that multiple reflection is occurring in a second wave or thereafter.

When a plurality of reflections occurs between the same object and a distance measuring sensor, a distance calculated by the second wave or thereafter of the reflected wave is twice or more integer times the first wave.

In addition, the reflected wave reflected for a plurality of times is attenuated by the plurality of times of the reflections, and the peak value becomes smaller than the reflected wave that has propagated the same distance.

Since the distance and peak value calculated from the reflected wave are used in the above configuration, it is possible to determine whether the reflected wave other than the first wave is a multiply reflected wave of the same object that reflected the first wave.

Therefore, it is possible to calculate the position of the object accurately if the reflected wave, which is a multiply reflected wave, is excluded from calculating the position of the object.

DETAILED DESCRIPTION OF THE PREFERRED EMBODIMENTS

Figure 1:
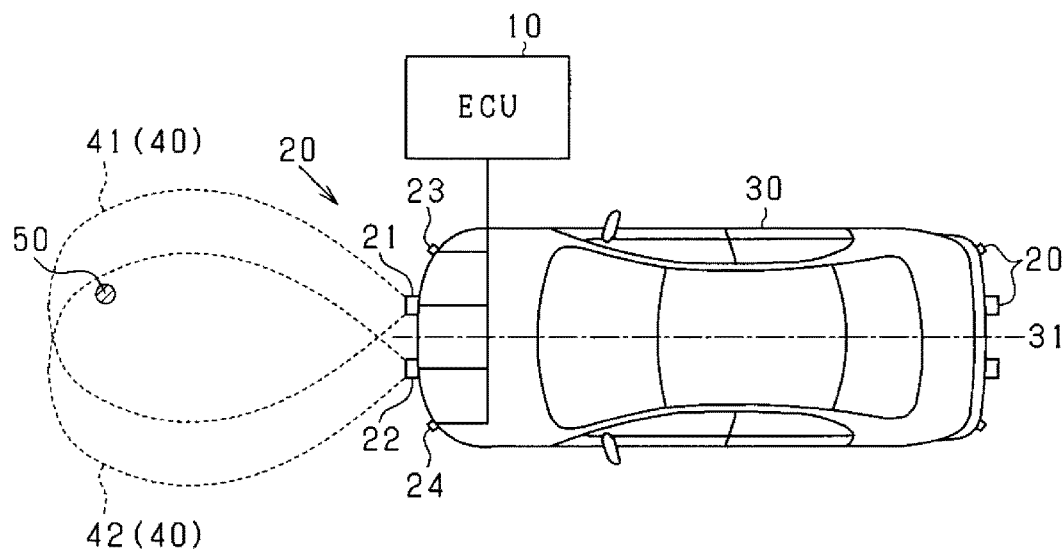
FIG. 1 shows a schematic configuration of an object detecting apparatus.

Hereinafter, embodiments will be described with reference to the drawings.

It should be appreciated that, in the following embodiments, components identical with or similar to each other are given the same reference numerals, and repeated structures and features thereof will not be described in order to avoid redundant explanation.

Hereinafter, a first embodiment embodying an object detecting apparatus mounted on a moving body will be described with reference to the drawings.

An object detecting apparatus according to the present embodiment is a vehicle-mounted apparatus mounted in a vehicle as a moving body, and by receiving detected information of an object from a distance measuring sensor, the object detecting apparatus detects objects such as other vehicles or road structures existing around the vehicle.

First, a general structure of an object detecting system of a vehicle according to the present embodiment will be described with reference to FIG. 1.

A distance measuring sensor 20 is, for example, an ultrasonic sensor having a function of transmitting an ultrasonic wave of frequency 20~100 kHz as probe waves, and a function of receiving the probe waves reflected from an object as reflected waves.

In the present embodiment, four distance measuring sensors 20 are mounted at a predetermined distance on a front of the vehicle (e.g., front bumper) so as to aligned in a direction perpendicular to a traveling direction of a vehicle 30 (i.e., vehicle width direction).

Specifically, the distance measuring sensors 20 include two center sensors (first sensor 21, second sensor 22) attached to positions in a vicinity of a center line 31 of the vehicle 30 symmetrically relative to the center line 31, and corner sensors 23, 24 attached respectively to a left corner and a right corner of the vehicle 30.

It should be noted that although the distance measuring sensors 20 are also attached on a rear of the vehicle (e.g., rear bumper) of the vehicle 30, attaching positions and functions of the sensors are the same as the distance measuring sensors 20 of the front of the vehicle, thus the description thereof will be omitted.

In each of the distance measuring sensor 20, an object detection range 40 is set as an area from which it is possible to receive a reflected wave (direct wave) of the self-transmitted probe wave.

Moreover, the distance measuring sensors 20 are disposed so that parts of the object detection ranges 40 of the adjoining two distance measuring sensors 20 overlap.

Although only the object detection ranges 41, 42 of the first and the second sensors 21 and 22 are shown in FIG. 1, the object detection ranges 40 are set similarly for the corner sensors 23, 24.

A threshold value of amplitude of the reflected wave is set to the distance measuring sensor 20, and when the distance measuring sensor 20 receives the reflected wave with the amplitude more than the threshold value, detected information including a receiving time of the reflected wave is transmitted to an ECU 10 which functions as the object detecting apparatus.

The ECU 10 is composed mainly of a microcomputer composed of a CPU and various types of memories, and detects a presence or absence of an object 50 around the vehicle based on the detected information of the object 50 that has been received from the distance measuring sensor 20.

Specifically, the ECU 10 transmits a control signal to the distance measuring sensor 20, and commands the distance measuring sensor 20 to transmit probe waves for each transmission time at a predetermined time interval (for example, several hundred milliseconds interval).

Moreover, when the ECU 10 receives the detected information of the object 50 from the distance measuring sensor 20, the ECU 10 determines the presence or absence of the object 50 around the vehicle based on the received detected information.

Then, when it is determined that the object 50 exists around the vehicle, a steering angle control or deceleration control of the vehicle 30 as a contact avoidance control is performed, or a notification by alarm sound to a driver of the vehicle 30 is performed so that the vehicle 30 does not contact the object 50.

The ECU 10 calculates a relative position (coordinates) of the object 50 with respect to the vehicle 30 by utilizing the principle of triangulation using the detected information of the object 50 inputted from the distance measuring sensor 20.

The principle of triangulation is to calculate coordinates of a measuring point using a distance between known two points and a distance between the respective measuring points of the known two points, as is well known.

According to this principle, the ECU 10 calculates the position (coordinates) of the object 50 by using a distance between the two distance measuring sensors 20 of which the object detection ranges 40 overlap, and a distance between the object 50 and each of the distance measuring sensor 20.

Figure 2:
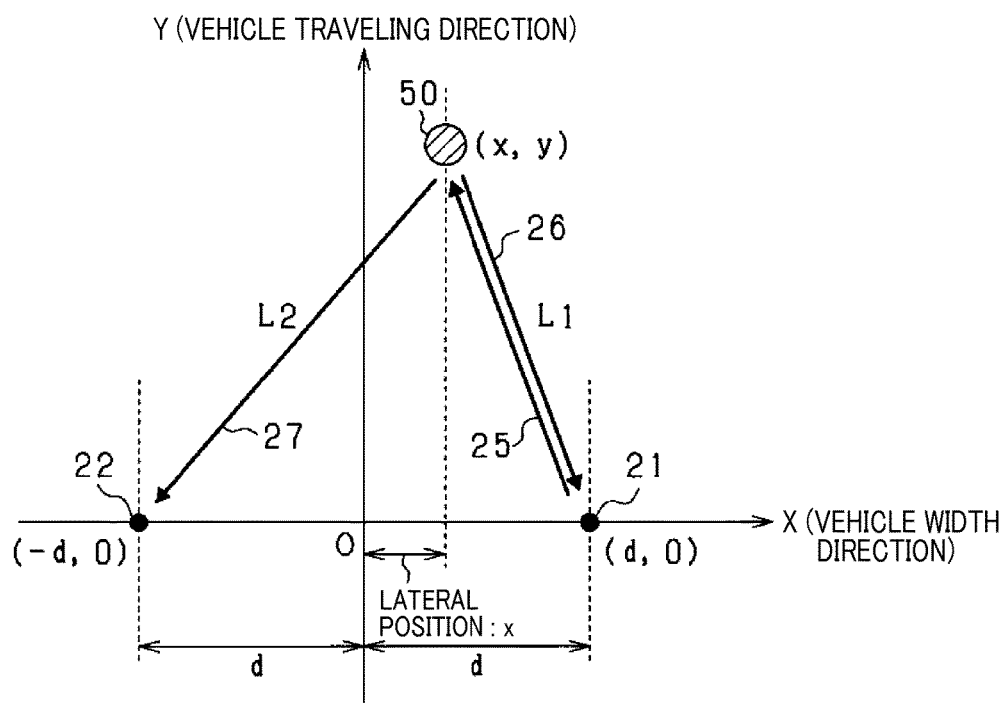
FIG. 2 shows a diagram for explaining a method of calculating an estimated position of an object.

FIG. 2 is a diagram for explaining a method of calculating the position of the object 50, and represents the first and second sensors 21, 22, and the object 50 positioned in front of the first and second sensors 21, 22 in a plan view.

It should be noted that in FIG. 2, the first sensor 21 is configured as a direct detection sensor that receives a direct wave 26 by sending probe waves 25, and the second sensor 22 is configured as an indirect detection sensor that receives a reflected wave of the probe waves 25 transmitted by the first sensor 21 as an indirect wave 27.

The ECU 10 sets a coordinate system by defining a straight line that passes through the first and second sensors 21, 22 as an X-axis and defining a straight line that passes through an intermediate portion between the first and second sensors 21, 22 as well as perpendicular to the X-axis as a Y-axis, and the ECU 10 calculates an X coordinate and a Y coordinate of the coordinate system as an estimated position of the object 50.

Specifically, the ECU 10 commands the first sensor 21 to transmit the probe waves 25.

Then, when the probe waves 25 is reflected and received by the first sensor 21 as the direct wave 26, a distance between the first sensor 21 and the object 50 is calculated based on the direct wave 26.

Further, when the reflected wave of the probe waves 25 is received by the second sensor 22 as the indirect wave 27, a distance between the second sensor 22 and the object 50 is calculated based on the received indirect waves 27.

A distance between an origin 0, which is an intersection of the X-axis and Y-axis, and the first sensor 21 and a distance between the origin 0 and the second sensor 22 are equal, and the distance d is stored in advance in the ECU 10.

In addition, the ECU 10 defines the time at which the first sensor 21 receives the direct wave 26 as a first time t1, while the ECU 10 defines the time as a second time t2 by subtracting the time that the first sensor 21 transmitted the probe waves 25 from the time that the second sensor 22 received the indirect waves 27.

In this case, a value obtained by multiplying the speed of sound by the first time t1 is two times the value of the distance between the first sensor 21 and the object 50, and a value obtained by multiplying the speed of sound by the second time t2 is the sum of the distance between the first sensor 21 and the object 50 and the distance between the second sensor 22 and the object 50.

The ECU 10 calculates the coordinates (x, y) of the object 50 by triangulation using the distance 2d between the first sensor 21 and second sensor 22, and the measured values of the first time t1 and the second time t2. Although it is described as an example in FIG. 2 that the first sensor 21 is the direct detection sensor and the second sensor 22 is the indirect detection sensor, the position of the object 50 is similarly calculated when the first sensor 21 is an indirect detection sensor and the second sensor 22 is a direct detection sensor.

In addition, among the four sensors 21-24, the position of the object 50 may be calculated for every combination of two adjoining sensors.

Likewise, in the distance measuring sensors 20 in the rear of the vehicle, the position of the object 50 is calculated using every combination of the two adjoining sensors.

Meanwhile, there may be two objects 50 that are present in the object detection range 40.

Figure 3:
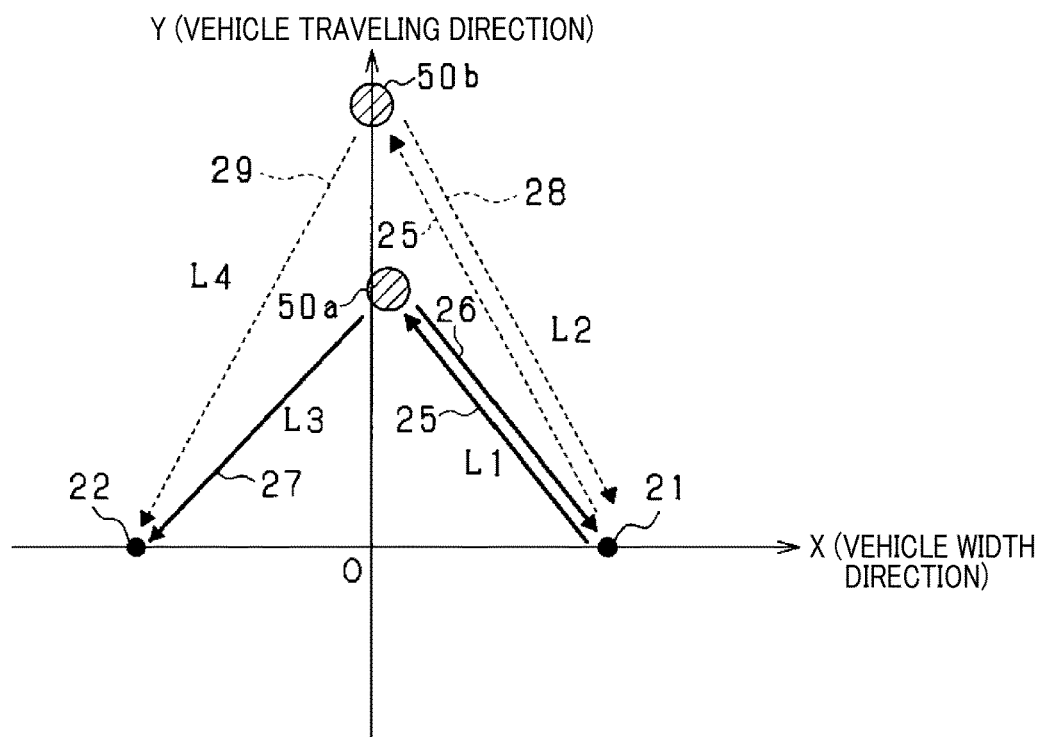
FIG. 3 shows a diagram for explaining a method of calculating estimated positions of two objects.

FIG. 3 shows an example in which a first object 50a and a second object 50b are present in the object detection range.

A distance between the first sensor 21 and the first object 50a is defined as a first distance L1, a distance between the first sensor 21 and the second object 50b is defined as a second distance L2, a distance between the second sensor 22 and the first object 50a is defined as a third distance L3, and a distance between the second sensor 22 and the second object 50b is defined as a fourth distance L4.

The probe waves 25 transmitted from the first sensor 21 is reflected by the first object 50a and the second object 50b, and each reflected wave is being incident to the first sensor 21 as a first direct wave 26 and second direct wave 28, respectively.

In addition, the probe waves 25 is reflected by the first object 50a and the second object 50b, and each reflected wave is being incident to the second sensor 22 as a first indirect wave 27 and a second indirect wave 29, respectively.

At this time, a propagation time of the first direct wave 26 will be based on the first distance L1, and a propagation time of the second direct wave 28 will be based on the second distance L2.

Therefore, a difference may occur between incident times of the first direct wave 26 and the second direct wave 28 corresponding to a difference between the first distance L1 and the second distance L2.

Similarly, a propagation time of the first indirect wave 27 will be based on the first distance L1 and the third distance L3, and a propagation time of the second indirect wave 29 will be based on the second distance L2 and the fourth distance L4.

Therefore, a difference may also occur between incident times of the first indirect wave 27 and the second indirect wave 29 corresponding to a difference between a sum of the first distance L1 and the third distance L3 and a sum of the second distance L2 and the fourth distance L4.

When calculating the positions of the two objects 50a, 50b by the triangulation, a combination that the triangulation establishes is used among one of the first direct wave 26 and the second direct wave 28 and one of the first indirect wave 27 and the second indirect wave 29.

There exists an intersection between a circle (not shown) with the first sensor 21 as a center and the first distance L1 as a radius and another circle (not shown) with the second sensor 22 as a center and the third distance L3 as a radius.

On the other hand, if the distance between the first object 50a and the second object 50b is large enough, and when using the first direct wave 26 and the second indirect wave 29, there will be no intersection between the circle with the first sensor 21 as the center and the first distance L1 as the radius and a circle (not shown) with the second sensor 22 as a center and having a radius given by subtracting the first distance L1 from the sum of the second distance L2 and the fourth distance L4.

In addition, even if an intersection is existed, the intersection becomes away from the front of the vehicle 30.

Therefore, in general, the position of the first object 50a is calculated by using the first direct wave 26 and the first indirect wave 27, and the position of the second object 50b is calculated by using the second direct wave 28 and the second indirect wave 29.

Figure 4:
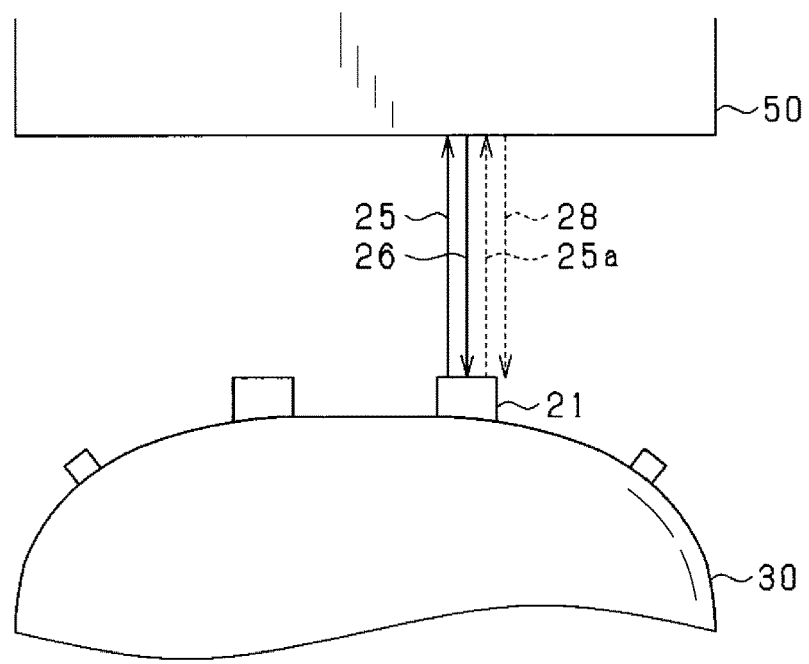
FIG. 4 shows a situation in which multiple reflection occurs.

When it is assumed that the second direct wave 28 has been detected also in addition to the first direct wave 26 in order to detect the two objects 50a, 50b in the object detection range 40, the first direct wave 26 reflected by the object 50 and arriving near the first sensor is reflected by the vehicle 30, and reaches to the object 50 again as a re-reflected wave 25a, as shown in FIG. 4.

The re-reflected wave 25a that has reached the object 50 is reflected by the object 50, and is incident to the first sensor 21 as a second direct wave 28.

The second direct wave 28 in this case is called a multiply reflected wave.

There is a possibility of falsely detecting an object that does not actually exist in a position farther than the object 50 is when performing the calculation of the triangulation by using the second direct wave 28 which is a multiply reflected wave.

In addition, if the false result is used, it becomes possible to perform the braking control or the like to avoid the vehicle contacting with the object that does not actually exist.

Therefore, a process for determining whether the second direct wave 28 is a multiply reflected wave or not is performed in the present embodiment.

Figure 5:
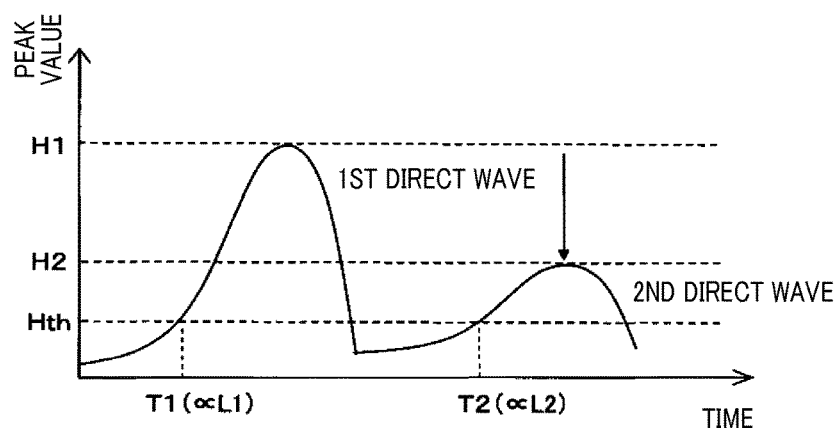
FIG. 5 shows a waveform.

FIG. 5 shows a received waveform when receiving the second direct wave 28 after receiving the first direct wave 26.

A first time T1 that is a time of receiving the first direct wave 26 and a second time T2 that is a time of receiving the second direct wave 28 are acquired as a time that a peak value exceeds a threshold value Hth.

At this time, the first distance L1 is obtained by multiplying the speed of sound by a value obtained by subtracting the first time T1 from a transmission time of the probe waves 25, and the second distance L2 is obtained by multiplying the speed of sound by a value obtained by subtracting the second time T2 from the transmission time of the probe waves 25.

Further, when a maximum value of the peak value of the first direct wave 26 is defined as a first peak value H1, and a maximum value of the peak value of the second direct wave 28 is defined as a second peak value H2, the second peak value H2 becomes smaller than the first peak value H1 by attenuation due to the distance.

Note that the first peak value H1 and the second peak value H2 may be acquired by a peak holding process or the like, respectively.

If the second direct wave 28 is a multiply reflected wave, the second distance L2 is twice the value of the first distance L1, and in addition to the attenuation due to the distance, attenuation larger than the attenuation due to the distance occurs to the second peak value H2 along with being reflected by the vehicle 30 and the object 50.

Therefore, in addition to the first time T1 and the second time T2, it is determined whether the second direct wave 28 is a multiply reflected wave or not by respectively acquiring the first peak value H1 and the second peak value H2.

Then, when the second direct wave 28 is a multiply reflected wave, it is sufficient that the second direct wave 28 is not used for calculating the position of the object 50.

At this time, when the second indirect wave 29 reflected by the other object has been received, it is also sufficient that the second indirect wave 29 is not used for calculating the position of the object 50.

Figure 6:
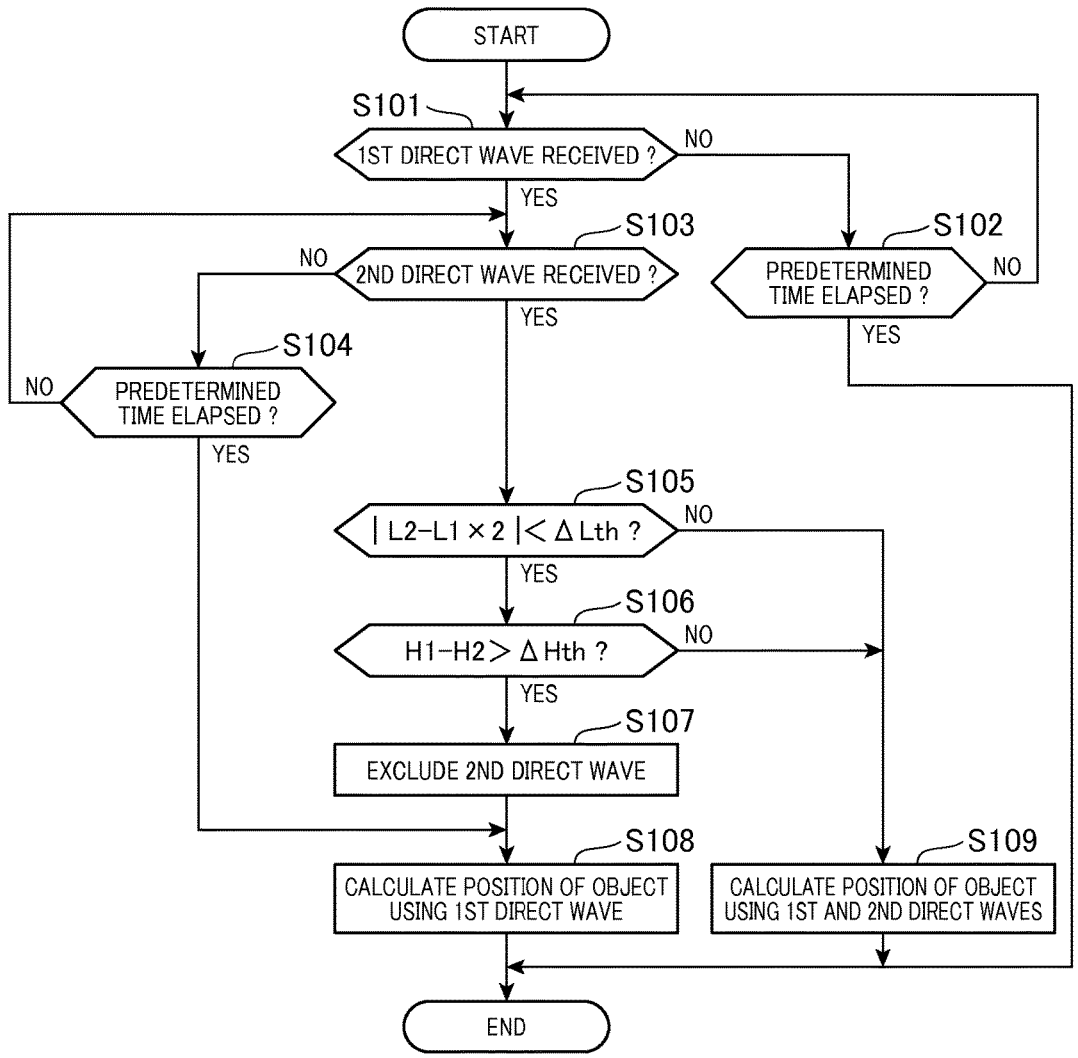
FIG. 6 shows a flowchart of processes according to an embodiment.

FIG. 6 is a flowchart showing a flow of a series of processes that the ECU 10 executes.

In the flowchart shown in FIG. 6, the series of processes is started when the first sensor 21 transmits the probe waves 25, and is executed at a predetermined control period.

First, it is determined whether the first direct wave 26 has been received (S101).

If it is determined that no first direct wave 26 has been received (S101: NO), it is determined whether a predetermined time has elapsed from the time that the transmission of the probe waves 25 has started (S102).

At this time, the predetermined time period is set based on the expected round-trip time for the ultrasonic wave in the object detection range 40 shown in FIG. 1.

If the predetermined time has not elapsed (S102: NO), the process of S101 is performed again, and if it is determined that the predetermined time has elapsed (S102: YES), the series of the processes ends, and the process waits until the next transmission time of the probe waves 25.

If it is determined that the first direct wave 26 has been received (S101: YES), the ECU 10 functions as a distance calculator and a wave height acquirer, and the ECU 10 acquires the first time T1 and the first peak value H1, then the first distance L1 is calculated by using the first time T1.

Subsequently, it is determined whether a second direct wave 28 has been received (S103).

If it is determined that the second direct wave 28 has not been received (S103: NO), similarly to S102, it is determined whether the predetermined time has elapsed from the time that the transmission of the probe waves 25 has started (S104).

If the predetermined time has not elapsed (S104: NO), the process of S103 is performed again.

If it is determined that the second direct wave 28 has been received (S103: YES), the ECU 10 functions as the distance calculator and the wave height acquirer, and the ECU 10 acquires the second time T2 and the second peak value H2, then the second distance L2 is calculated by using the second time T2.

Then, the ECU 10 functions as multiple reflection determiner, and in order to determine whether the second direct wave 28 is a multiply reflected wave or not, it is determined whether an absolute value of a difference between twice the value of the first distance L1 and the second distance L2 is a value smaller than a distance threshold value $\Delta$Lth or not (S105).

The distance threshold value $\Delta$Lth is set in advance as a value indicating that the difference between twice the value of the first distance L1 and the second distance L2 is found to be sufficiently small, and is stored in the memory of the ECU 10.

If the absolute value of the difference between twice the value of the first distance L1 and the second distance L2 is smaller than the distance threshold value $\Delta$Lth (S105: YES), it is determined whether a difference between the first peak value H1 and the second peak value H2 is larger than a wave height threshold $\Delta$Hth or not (S106).

The wave height threshold $\Delta$Hth is set in advance as a value that can be determined to indicate attenuation by multiple reflection, and is stored in the memory of the ECU 10.

Note that the wave height threshold $\Delta$Hth may be set variably in accordance with the first peak value H1.

If the difference between the first peak value H1 and the second peak value H2 is larger than the wave height threshold $\Delta$Hth (S106: YES), the second direct wave 28 can be said to be attenuated.

Therefore, since it can be estimated that the second direct wave 28 has been multiply reflected, the second direct wave 28 is excluded (S107), and the position of the object 50 is calculated by using the first direct wave 26 (S108).

At this time, the ECU 10 functions as an excluder.

It should be noted that even when the predetermined time has elapsed without receiving the second direct wave 28 (S104: YES), the position of the object 50 is calculated by using the first direct wave 26 (S108).

Then, the series of the processes ends, and wait until the next transmission time of the probe waves 25.

On the other hand, if the absolute value of the difference between twice the value of the first distance L1 and the second distance L2 is not smaller than the distance threshold value $\Delta$Lth (S105: NO), there is a high probability that the object 50 that has reflected the probe waves 25 as the first direct wave 26 and the object 50 that has reflected the probe waves 25 as the second direct wave 28 are different objects.

Then, the position of the object 50 is calculated by performing the triangulation using the first direct wave 26 and the second direct wave 28 (S109).

In addition, if the difference between the first peak value H1 and the second peak value H2 is smaller than the height threshold $\Delta$Hth (S106: NO), the second direct wave 28 has been reflected by the second object 50b that is located farther than the first object 50a is, and only the attenuation due to the distance has occurred in the second peak value H2, thus there is a high probability that attenuation due to multiple reflections has not occurred.

Even in this situation, the position of the object 50 is calculated by performing the triangulation using the first direct wave 26 and the second direct wave 28 (S109).

Then, the series of the processes ends, and wait until the next transmission time of the probe waves 25.

With the above structure, the object detecting apparatus according to the embodiment has the following effects.

When the second direct wave 28 and the second indirect wave 29 are used for controlling the vehicle, it is possible to calculate the positions of the first object 50a and the second object 50b in the object detection range 40.

On the other hand, if the second direct wave 28 is a multiply reflected wave, and when the calculation of the triangulation is performed by using the second direct wave 28, a position of an object 50 that does not exist may be calculated.

In this regard, in the present embodiment, it is determined whether the second direct wave 28 is a multiply reflected wave or not, and when the second direct wave 28 is determined to be a multiply reflected wave, the position of the object 50 is calculated excluding the second direct wave 28.

Therefore, there is no possibility to calculate the position of an object 50 that does not exist using the second direct wave 28 that is a multiply reflected wave, and it is possible to suppress braking control or the like for avoiding non-existing objects 50.

When determining whether the second direct wave 28 is a multiply reflected wave or not, it is based on the fact that the second distance L2 obtained by the second direct wave 28 is twice the first distance L1 obtained by the first direct wave 26.

Therefore, it can be determined accurately that the object 50 that has reflected the first direct wave 26 and the object 50 that has reflected the second direct wave 28 is the same object 50.

When the second direct wave 28 is determined to be a multiply reflected wave or not, it is based on the fact that the second peak value H2 of the second direct wave 28 is attenuated more than or equal to the predetermined value compared to the first peak value H1 of the first direct wave 26.

Therefore, the second direct wave 28 can be determined to be a multiply reflected wave when attenuation of the second direct wave 28 is not only due the distance, but also attenuation due to multiple reflections.

<Modification>

In the above embodiment, although up to the second direct wave is detected to calculate the positions of the two objects, a third or higher-order direct wave it may be detected to calculate the positions of the three objects 50.

At this time, a situation where the first direct wave and the second direct wave are respectively reflected by different objects and the third direct wave is a multiply reflected wave of one of the objects, and another situation where the second direct wave is a multiply reflected wave of the object that reflected the first direct wave and the third direct wave is reflected by the other one of the objects may occur.

In addition, a situation where both the second direct wave and the third direct wave are a multiply reflected waves of the object that has reflected the first direct wave may also occur.

Therefore, the process for determining whether a wave is a multiply reflected wave shown in the above embodiment may be used respectively for a determination that uses the first direct wave and the second direct wave, a determination that uses the first direct wave and the third direct wave, and a determination that uses the second direct wave and the third direct wave.

Further, if the second direct wave 28 is multiply reflected, and if the third direct wave is not multiply reflected, there is a risk of detecting an object different from the object detected by the first direct wave using the third direct wave.

Note that even when using an n-th direct wave (where n is an integer of 4 or more), it is possible to perform a similar process.

Although the determination of whether a wave is a multiply reflected wave or not is performed by using the second distance L2 calculated by the second wave and the second peak value of the second wave H2 in the above embodiment, the third wave may also be obtained in order to determine that a wave is a multiply reflected wave.

Then, it is determined whether a distance calculated by the third wave is three times that of the first distance L1 or not.

It is considered that the probability of the multiple reflection occurring is even higher when the second distance L2 is twice the first distance L1, and a distance calculated by the third wave is three times that of the first distance L1.

It is possible to improve accuracy of calculating the position of the object with the configuration that excludes reflected waves from the calculation of the position of the object by using the distance calculated by the third wave also.

In the above embodiment, the distance measuring sensor 20 that has detected a multiply reflected wave may stop the calculation of the position by using the detected information that the distance measuring sensor 20 has acquired until a multiply reflected wave is no longer detected.

Although the above embodiment has exemplified one using ultrasonic waves as probe waves, it is possible to use waves other than ultrasonic waves, for example, other sound waves or radio waves as probe waves.

That is, as long as it uses a wave that has predetermined amplitude as probe waves.

Although an object detecting apparatus is intended to be mounted on a vehicle 30 in the above embodiments, an object to be equipped with may be a moving object other than a vehicle, such as airplanes, ships, robots or the like.

Further, the object detecting apparatus may be mounted on a fixed object, and it can be used to measure a distance between the fixed object and another object around the fixed object.

Even when the object detecting apparatus is mounted on the fixed object, multiple reflection between the fixed object and the surrounding object may occur.

In addition, the object detecting apparatus maybe worn by a human, or may be carried, and it can also be used for informing an approach of surrounding objects to the human.

What is claimed is:

1. An object detecting apparatus that detects a position of an object by transmitting probe waves in surroundings and receiving reflected waves of the probe waves as detected information of the object, comprising:
   a distance calculator that calculates a distance to the object by using a plurality of reflected waves in response to the plurality of reflected waves being received for a single transmission time of the probe waves;
   a wave height acquirer that acquires a respective peak value of the plurality of reflected waves;
   a multiple reflection determiner; and a plurality of distance measuring sensors, used to obtain wave reflections from object detection ranges, the distance measuring sensors being separated in position to allow for triangulation and disposed such that at least a portion of the object detection ranges of adjoining distance measuring sensors overlap, the object detection ranges being areas from which the distance measuring sensors receive a reflected wave of the probe waves, wherein, the multiple reflection determiner is configured to wait a predetermined time after receiving a first reflected wave for a second reflected wave, wherein, the multiple reflection determiner is configured to determine that multiple reflection is occurring in the second wave or thereafter based on a first reflected wave for which a first distance to the object is calculated as the smallest among the plurality of reflected waves, which is defined as a first wave, and based on the second reflected wave to which a second distance is calculated as twice or more integer times the first distance calculated for the first wave, and further based on a peak value of the second reflected wave indicating an attenuation larger than an attenuation caused by the second distance, wherein, the distance calculator calculates the distance to the object by using the first reflected wave and the second reflected wave in response to the difference between a peak value of the first reflected wave and the peak value of the second reflected wave being less than a wave height threshold.

2. The object detecting apparatus according to claim 1, the object detecting apparatus further comprising: an excluder configured to exclude the second wave or thereafter from being used to calculate the position of the object as a result of the multiple reflection determiner determining that the multiple reflection is occurring.

3. The object detecting apparatus according to claim 2, wherein, based on the second wave for which the second distance is twice the first distance calculated by the first wave and the difference of the peak value relative to the first wave which is larger than the predetermined value being present in the plurality of reflected waves, and based on a third wave to which a third distance is three times the first distance calculated by the first wave being present in the plurality of reflected waves, the excluder is configured to exclude a reflected wave of the second wave from being used to calculate the position of the object.

4. The object detecting apparatus according to claim 1, the object detecting apparatus further comprising:

a calculator configured to calculate a position of an imaginary object by using the reflected waves of the second wave or thereafter in response to the multiple reflection determiner determining that multiple reflection is occurring.

5. The object detecting apparatus according to claim 1, wherein, the object detecting apparatus is applied to a system provided with the plurality of distance measuring sensors for transmitting the probe waves and receiving the reflected wave; and the object detecting apparatus further comprising:

a stopper configured to stop calculation of the position using the reflected wave received by the distance measuring sensor to which the multiple reflection is occurring, based on a determination by the multiple reflection determiner that multiple reflection is occurring.

* * * * *